(12) United States Patent
Liddell et al.

(10) Patent No.: US 12,476,699 B2
(45) Date of Patent: Nov. 18, 2025

(54) BEAM LAYOUT OPTIMISATION

(71) Applicant: Inmarsat Global Limited, London (GB)

(72) Inventors: Adam Alexander Liddell, London (GB); Pavan Bhave, London (GB); Benjamin Moores, London (GB)

(73) Assignee: Inmarsat Global Limited, London (GB)

( * ) Notice: Subject to any disclaimer, the term of this patent is extended or adjusted under 35 U.S.C. 154(b) by 0 days.

(21) Appl. No.: 18/590,697

(22) Filed: Feb. 28, 2024

(65) Prior Publication Data

US 2024/0429997 A1    Dec. 26, 2024

Related U.S. Application Data

(63) Continuation of application No. 17/484,395, filed on Sep. 24, 2021, now Pat. No. 11,923,961, which is a continuation of application No. 16/621,488, filed as application No. PCT/GB2018/051588 on Jun. 11, 2018, now Pat. No. 11,133,860.

(30) Foreign Application Priority Data

Jun. 12, 2017  (GB) .................................... 1709322

(51) Int. Cl.
*H04B 7/185* (2006.01)
*H04B 7/0408* (2017.01)

(52) U.S. Cl.
CPC ....... *H04B 7/18513* (2013.01); *H04B 7/0408* (2013.01)

(58) Field of Classification Search
CPC .................. H04B 7/2041; H04B 7/18513; H04B 7/0408; H04B 7/086; H04B 7/185; H04B 7/18502; H04B 7/18519; H04B 7/18523; H04B 7/04
See application file for complete search history.

(56) References Cited

U.S. PATENT DOCUMENTS

| 5,734,345 A | 3/1998 | Chen et al. |
| 5,754,139 A | 5/1998 | Turcotte et al. |
| 5,856,804 A | 1/1999 | Turcotte et al. |
| 6,456,824 B1 | 9/2002 | Butte et al. |
| 6,553,225 B1 | 4/2003 | Zhao et al. |
| 6,625,129 B1 | 9/2003 | Olds et al. |
| 7,945,269 B2 | 5/2011 | Drakos |
| 9,379,806 B1 * | 6/2016 | Mandell ............... H01Q 3/40 |

(Continued)

FOREIGN PATENT DOCUMENTS

| EP | 1093242 A1 | 4/2001 |
| EP | 1107476 A2 | 6/2001 |

(Continued)

*Primary Examiner* — Keith Ferguson
(74) *Attorney, Agent, or Firm* — Sterne, Kessler, Goldstein & Fox P.L.L.C.

(57) ABSTRACT

A beam layout is optimised for a given traffic distribution and network state by determining optimum beam centre positions and generating a beam layout so as to meet system requirements and minimise the distances of locations within a coverage area from the optimum beam centre positions. Adjacent beams in low traffic areas may be merged.

28 Claims, 6 Drawing Sheets

(56) References Cited

U.S. PATENT DOCUMENTS

| | | | |
|---|---|---|---|
| 2004/0092257 A1* | 5/2004 | Chung | H04B 7/2041 |
| | | | 370/316 |
| 2008/0008264 A1* | 1/2008 | Zheng | H04B 7/06 |
| | | | 375/267 |
| 2013/0210424 A1* | 8/2013 | Boustie | H04W 72/0446 |
| | | | 455/427 |
| 2015/0229385 A1 | 8/2015 | Roos | |
| 2016/0087713 A1 | 3/2016 | Oderman et al. | |
| 2018/0152351 A1* | 5/2018 | Roy | H04B 7/18528 |

FOREIGN PATENT DOCUMENTS

| | | |
|---|---|---|
| EP | 2632061 A1 | 2/2012 |
| WO | 200349409 A2 | 12/2003 |

* cited by examiner

BEAM LAYOUT OPTIMISATION

FIELD OF THE INVENTION

The present invention relates to a method and apparatus for determining an optimised beam layout in a satellite communications system.

BACKGROUND OF THE INVENTION

In conventional phased-array satellite systems, such as the applicant's BGAN (Broadband Global Area Network) system operating over an Inmarsat-4 (I4) satellite, the coverage is provided by a beam layout comprising global, regional and/or narrow beams. Each beam may be specified as a weighted sum of the phased-array element beams and the beam weights and logical boundaries can be updated in response to events or requirements, such as for bespoke service coverage or interference management. Typically, this beam layout may be effectively static, with updates performed manually on a beam-by-beam basis.

A sample conventional beam layout of congruent beams is shown in FIG. 1, where the beam edges represent the logical beam coverage boundaries. A problem with a static beam layout of congruent beams is that it is typically only optimal for a uniform user and demand distribution; for non-uniform traffic profiles, regions of high throughput demand or user density may lie at the edge of a beam, where the system performance is typically degraded as compared to the beam centre.

In practice, the distribution of users and demand for a satellite system is almost always non-uniform and varies significantly with time. This distribution is typically composed of a number of high demand 'hotspots' over populated areas, whilst other regions of the coverage remain largely unoccupied.

U.S. Pat. No. 5,754,139 discloses a beam forming system that is responsive to traffic demand, by providing additional antenna beams for areas of high traffic demand. The antenna beams are apparently shaped to optimize geographic coverage, but no consideration is given to the overall beam layout.

SUMMARY OF THE INVENTION

According to one aspect of the present invention, there is provided a method and system for optimising a beam layout for a given traffic distribution and network state by determining optimum beam centre positions and generating a beam layout so as to meet system requirements and minimise the distances of locations within a coverage area from the optimum beam centre positions.

The traffic distribution and network state may be mapped into a parameter density function based on the parameter or parameters that are being optimised for, such as user density or throughput demand. This parameter density function may be interpolated over the satellite footprint, to reduce computational complexity.

The optimised beam centre positions may be determined by minimising a function including one or more sub functions representing:
  the attraction of beam centres to regions of high parameter density;
  the behaviour of beam centres with respect to each other;
  a tendency to restore the beam centres towards their previous locations; and/or
  containment of the beam centres to a coverage area The choice of minimisation method may be augmented with a basin-hopping step to ensure a global or near-global minimum is found.

An optimised beam layout may be derived from the optimised beam centres, so as to minimise the distance of locations within the coverage area from the optimised beam centres and to meet other system requirements or constraints. The optimised beam layout may be simplified, for example by quantisation to a predetermined grid.

Adjacent beams in areas with a low parameter density may be merged. The merging step may be carried out independently from the determination of optimum beam centre positions. Optionally the geometry of the beam layout after merging may be simplified.

Specific users or groups may be allocated a separate dedicated beam overlaid on the optimised beam layout, such as for high throughput or high priority users. These users may be removed from the general traffic distribution so that they do not affect calculation of the optimum beam layout.

The methods may be repeated, so that the optimised beam layout is continuously or periodically re-optimised according to the current traffic distribution.

A set of phased-array beam weights may be calculated by a beam weight generator so as to produce beam coverage patterns (Gain, EIRP, G/T, etc.) corresponding at least approximately to the optimised beam layout. The beam weights may be provided to a satellite beam former so as to generate the beam layout.

The method may be implemented by a computer program and/or suitably configured hardware or firmware.

BRIEF DESCRIPTION OF THE DRAWINGS

Specific embodiments of the present invention will now be described with reference to the accompanying drawings, in which.

DETAILED DESCRIPTION OF EMBODIMENTS

Definitions

Figure 1:
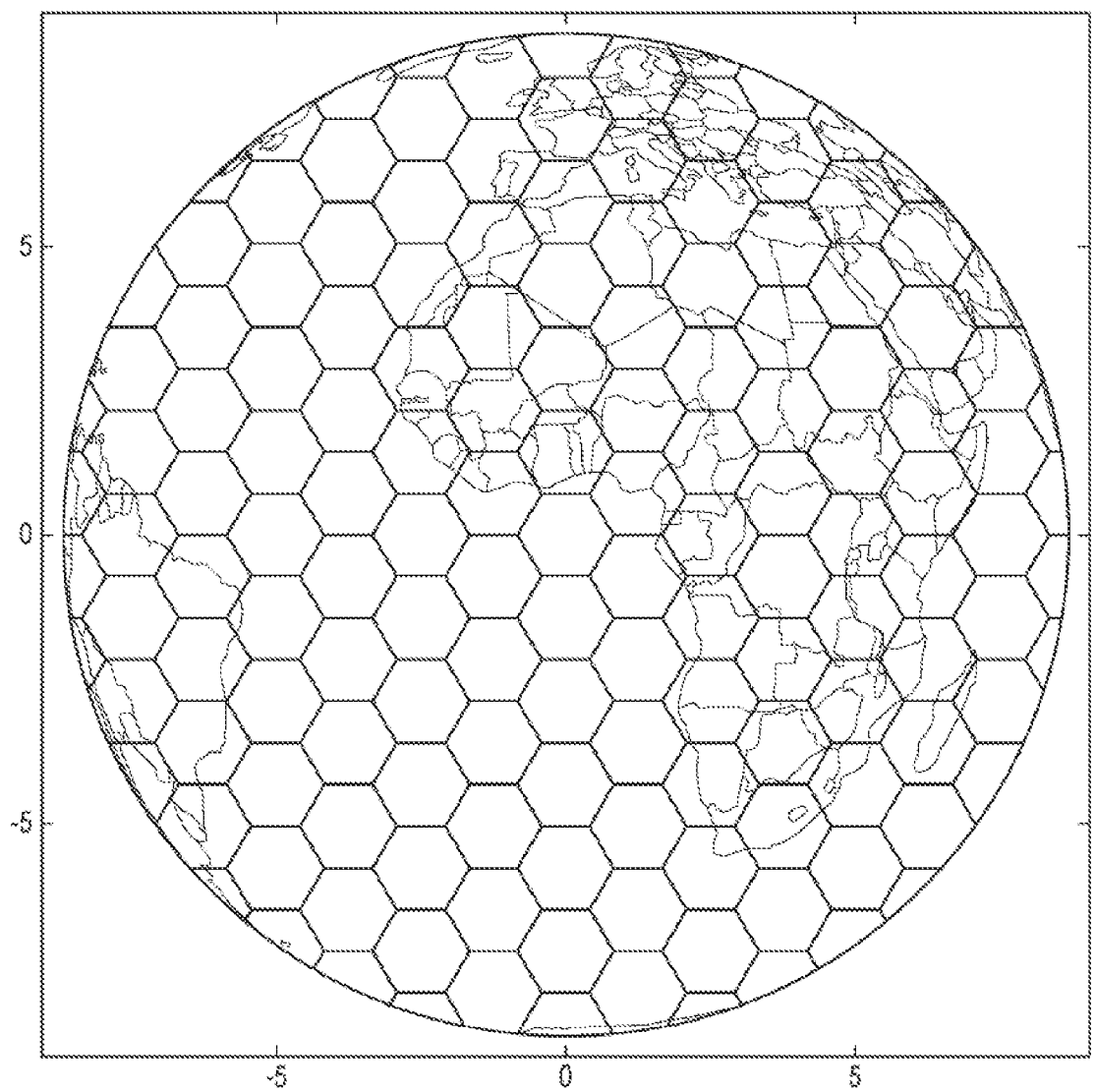
FIG. 1 shows an example of a conventional satellite beam layout with congruent beams.

Specific terms as used herein are defined as follows:

Beam Layout: This specifies the logical borders of a set of beams for a single satellite, defined by the polygon vertices in the satellite viewpoint/boresight projection. An example beam layout is shown in FIG. 1, however regions in the layout need not necessarily be served by exactly one beam and overlaps are possible.

Beam Pattern: The performance characteristics (EIRP, G/T, etc.) of a single beam over the satellite coverage area.

Overview

Figure 2:
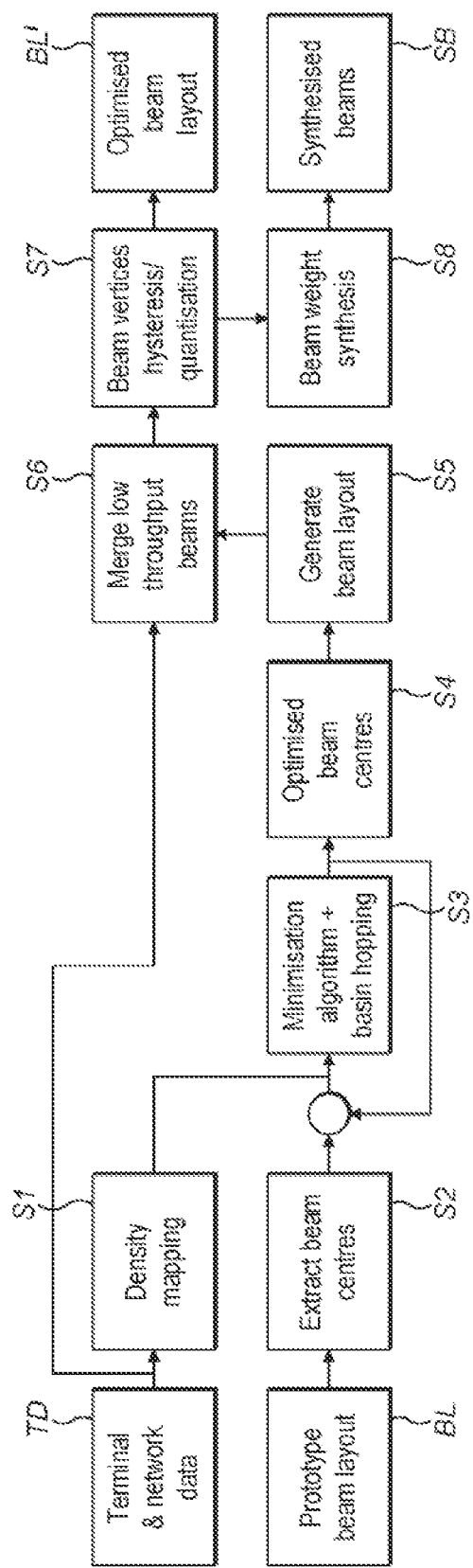
FIG. 2 is a flow diagram of the method of operation of an embodiment of the invention.

FIG. 2 shows an overview of a dynamic beam layout optimisation method and system according to an embodiment of the invention, with inputs at the left, processing steps in the centre and outputs to the right. The system/method takes as input a prototype beam layout or set of beam centres BL and terminal and network data TD and produces as output an optimised beam layout B'.

The prototype beam layout may be such as shown in FIG. 1 or a prior output from the dynamic beams system/method according to the embodiment. Where the prototype beam layout is a prior output of the system/method, the conversion from centres to layout (step S5) and from layout to centres (step S2) may be skipped within the system/method.

The terminal and network data TD may be a continuously or periodically updated stream of information about the locations and parameters of all terminals within the network, in addition to the current state of network components.

As the terminal and network data TD is updated, the system/method can be run iteratively on the input data to provide a constantly optimised beam layout BL' for the present system state. In each iteration, the prior output beam layout BL' may be used as the input prototype beam layout BL for the current optimisation.

The system/method shown includes two logically distinct sub-systems/methods, each of which could be run in combination or separately for each satellite or coverage region:
 i. Beam Centre Optimisation: targets beam centres to regions of high parameter density (steps S1 to S5)
 ii. Beam Merge: coalesces adjacent beams to reduce unused resources (step S6)

The final beam-weight synthesis step S8 may be performed externally of the remainder of the system/method, for example using a common framework shared for all beam layout optimisation tasks across all services, to produce a set of synthesised beam patterns.

The individual steps of the system/method will be described in more detail below.

Density Mapping

At the density mapping step S1, satellite and ground network monitoring infrastructure provides terminal and network data TD for a set of M terminals at locations L={ $l_1, \ldots, l_M$ } ⊂ $\mathbb{R}^2$, each with an associated weighting metric W={ $w_1, \ldots, w_M$ } ⊂ $\mathbb{R}_{\geq 0}$, where |L|=|W|=M∈ $\mathbb{Z}^+$. The positions L are in a satellite viewpoint projection, such as shown in FIG. 1. The weighting metric sets the target optimisation parameter; this may, for example, be terminal data throughput, traffic priority, a combination of the above or a uniform weight $w_n$=1∀n∈[1,M].

From these locations L and weights W, there is defined a density function d($\bar{x}$), d: M· $\mathbb{R}^2 \to \mathbb{R}$. As an example, this may be implemented as a weighted Gaussian kernel density estimation, with constant bandwidth σ:

$$d(\bar{x}) = \sum_{k=1}^{|L|}\left(w_k \cdot e^{\frac{-|\bar{x}-\bar{l}_k|^2}{2\sigma^2}}\right) / \sum_{w \in W} w$$

This density function can be normalised to the range [0,1], to provide non-dependent component weights in the scalar function V defined later:

$$d_n(\bar{x}) = \frac{d(\bar{x}) - \min_{\bar{y} \in \mathbb{R}^2}(d(\bar{y}))}{\max_{\bar{y} \in \mathbb{R}^2}(d(\bar{y})) - \min_{\bar{y} \in \mathbb{R}^2}(d(\bar{y}))}$$

Figure 3:
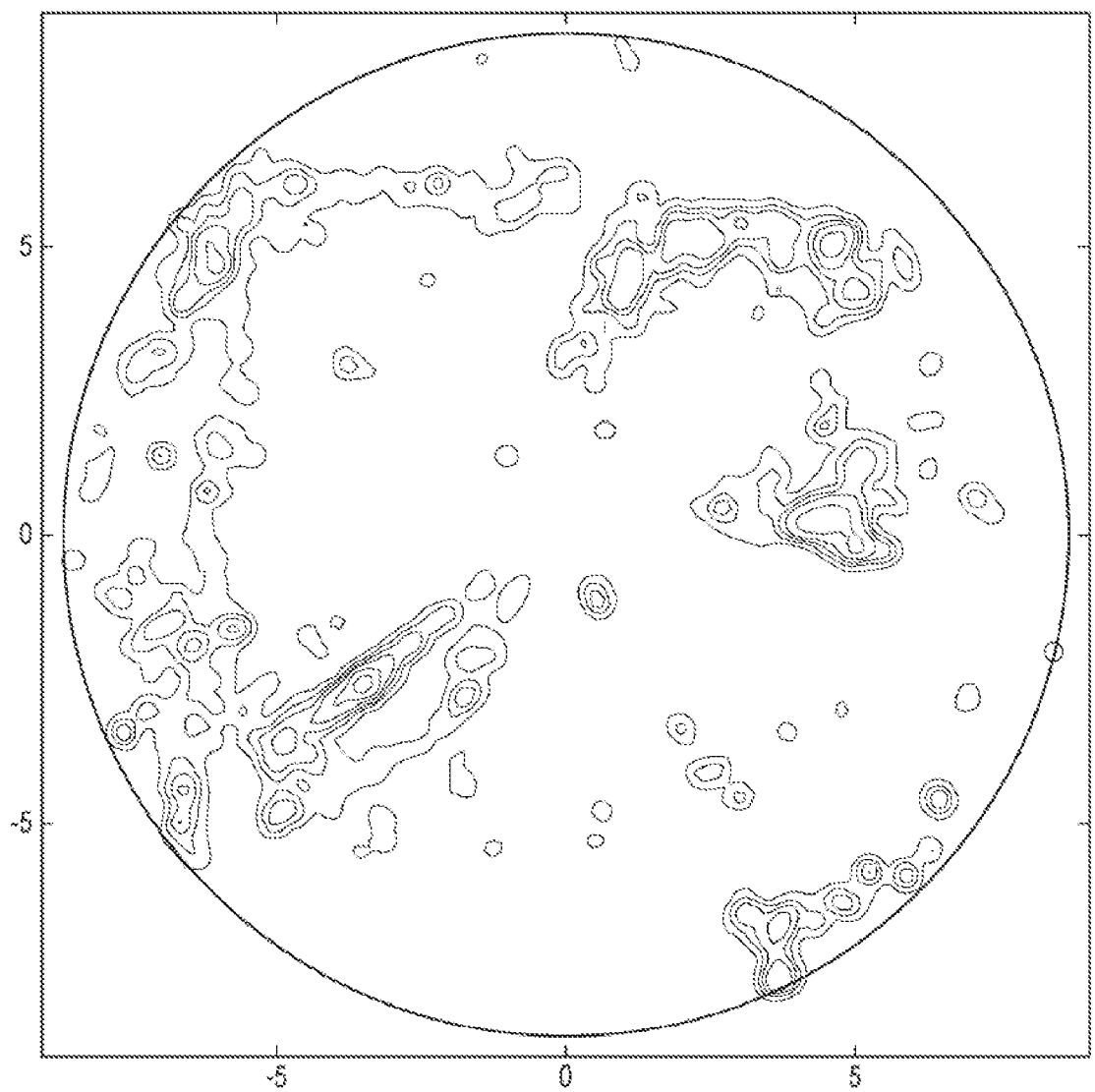
FIG. 3 shows the contours of an example density function mapped for a representative traffic distribution

The density function may also be mapped by a function $f_c$, to remove outliers and set a soft low threshold, as shown in FIG. 3. The example below is of a composite of a sigmoid function and fractional exponent, with the parameters { $S_e$, $S_p$, $S_c$ } ⊂ $\mathbb{R}_{\geq 0}$:

$$d_c(\bar{x}) = f_c(d_n(\bar{x})) = \frac{d_n(\bar{x})^{1/S_e}}{1 + e^{-S_p \cdot (d_n(\bar{x}) - S_c)}}$$

Any of these density functions d($\bar{x}$), $d_n(\bar{x})$ or $d_c(\bar{x})$ may be sampled and interpolated over the domain of the satellite footprint to reduce computational complexity in subsequent calculations.

Beam Centres Optimisation

From an input prototype beam layout, such as in FIG. 1, the beam centres are extracted in step S2 and optimised at step S3. The beam centres may, for example, be extracted via the geometric centroid of each polygon, giving a set of N beam centres C={ $\bar{p}_1, \ldots, \bar{p}_N$ } ⊂ $\mathbb{R}^2$ where $$\bar{p}_n = \begin{pmatrix} x_n \\ y_n \end{pmatrix} \text{ and } r_n = |\bar{p}_n| = \sqrt{x_n^2 + y_n^2}$$

For these centres C, there is defined a scalar function V: N· $\mathbb{R}^2 \to \mathbb{R}$:

$$V(C) = \sum_{p_i \in C}\left(-K_d \cdot d_c(\bar{p}_i) + K_a \cdot \sum_{p_j \in C, j \neq i}\left(\left(\frac{r_m}{|\bar{p}_i - \bar{p}_j|}\right)^{12} - 2 \cdot \left(\frac{r_m}{|\bar{p}_i - \bar{p}_j|}\right)^6\right) + K_r \cdot |\bar{p}_i - \bar{p}_i^0| + K_c \cdot b_c^{(r_i - r_c)}\right)$$

This function is composed of four sub-functions, weighted by the configurable parameters { $K_d$, $K_a$, $K_r$, $K_c$ } ⊂ $\mathbb{R}_{\geq 0}$.

The component $-K_d \cdot d_c(\bar{p}_i)$ contains the attraction of the beam centres to the regions of high parameter density in the density function $d_c$. The density functions d and $d_n$ may be used alternatively.

The component $$K_a \cdot \sum_{p_j \in C, j \neq i}\left(\left(\frac{r_m}{|\bar{p}_i - \bar{p}_j|}\right)^{12} - 2 \cdot \left(\frac{r_m}{|\bar{p}_i - \bar{p}_j|}\right)^6\right)$$

dictates the behaviour of the beam centres in relation to one another and sets the neutral inter-centre spacing $r_m \in \mathbb{R}_{\geq 0}$, which can be based on the performance capabilities of the satellite and network systems. The functional minimum of this component alone is a near hexagonal tessellation, similar to the beam layout shown in FIG. 1.

The component $K_r \cdot |\bar{p}_i - \bar{p}_i^0|$ acts to restore the centre $\bar{p}_i$ to its prototype location $\bar{p}_i^0$ The component $K_c \cdot b_c^{(r_i - r_c)}$ soft restricts the beam centres to a radius $r_c$, based on the exponent with base $b_c$. This component may be replaced with alternative regional or coverage constraints.

The optimisation of the location of the beam centres is therefore reduced to minimising the scalar function V, to get the set of beam centres C':

$$C' = \{\overline{p}_1', \ldots, \overline{p}_N'\} = \underset{C}{\mathrm{argmin}}\, V(C)$$

With arg min defined as $$X_m = \underset{X}{\mathrm{argmin}}\, f(X) \Leftrightarrow f(X_m) = \underset{X \in R}{\mathrm{min}}\, f(X)$$

This minimisation can be implemented using standard minimisation methods and can achieve a large performance gain by exploiting the differentiability of the potential V, to allow the use of gradient descent type algorithms. Any of these minimisation algorithms may be combined with a basin-hopping implementation to ensure the global or near-global minimum is found.

The output C' can be fed back into the same minimisation algorithm, when new data (L',W') is available or when reconfiguring the coefficients $\{K_d, K_a, K_r, K_c\}$:

$$C'' = \{\overline{p}_1'', \ldots, \overline{p}_N''\} = \underset{C'}{\mathrm{argmin}}\, V(C')$$

This iteration allows for continuous optimisation of the beam layout as the user and network demands evolve.

Beam Layout Generation

Figure 4:
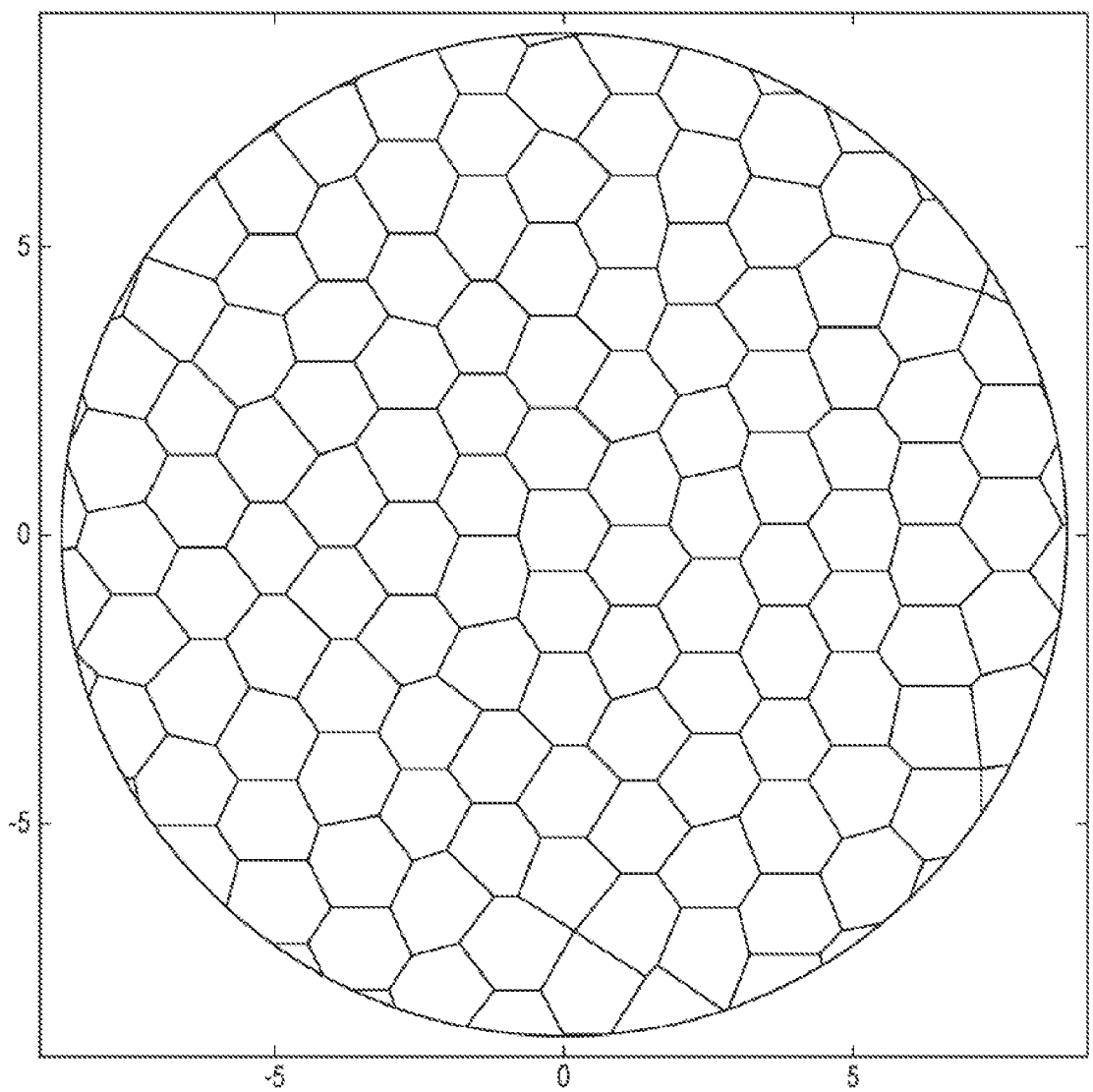
FIG. 4 is a sample optimised beam layout in an embodiment.

From each set of optimised beam centres (C', C", ... ), the new beam layout is generated at step S5. The method to map beam centres to a beam layout may be selected or designed based on the constraints of the satellite and network systems. To generate the beam layout with minimum centre distance for every location, the beam centres can be used in a Voronoi tessellation with a Euclidean distance metric. For example, FIG. 4 shows the resulting beam layout from the Voronoi decomposition of an optimised set of beam centres. The truncated beams at the edge of coverage may be further processed to meet coverage requirements.

Whilst the Voronoi method guarantees every location is covered by exactly one beam, alternative beam layout generation methods could be implemented that intentionally overlap beams and perform more extensive load/handover balancing in the areas of multiple coverage.

Beam Merge

As a second stage optimisation, sets of adjacent beams may be coalesced into larger beams, at step S6, where one channel in a large beam is more efficient than independent channels in each of the component narrow beams. This step primarily targets low-throughput regions, however beams may also be merged due to other network requirements. The thresholds and constraints for merging beams are dependent on the comparative beam performance differential between the large and narrow beams, which will determine the level at which the independent beams become more efficient.

Figure 5:
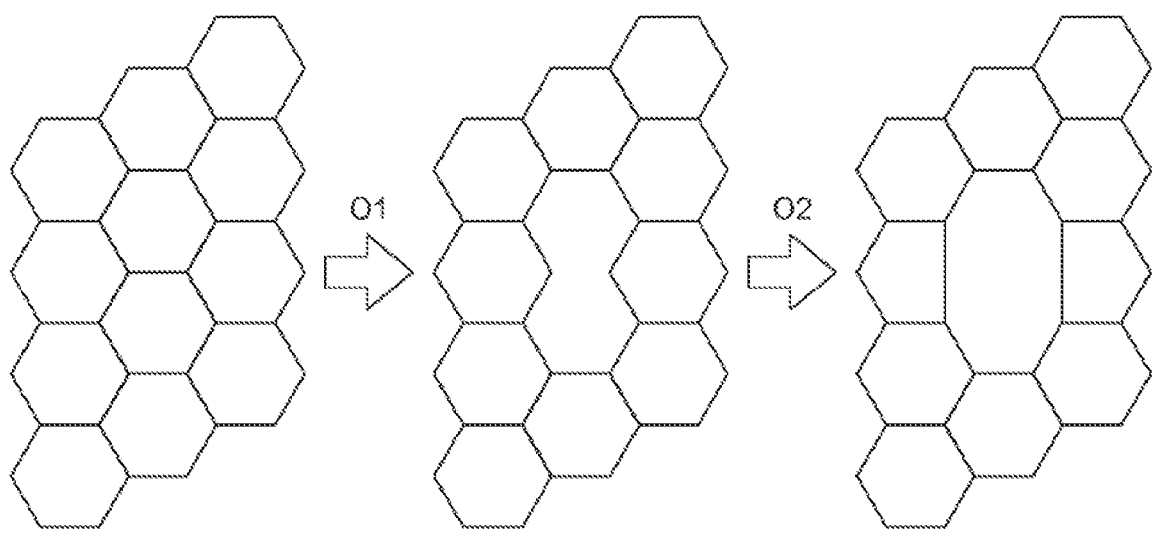
FIG. 5 shows an example of beam merging in an embodiment.
Figure 6:
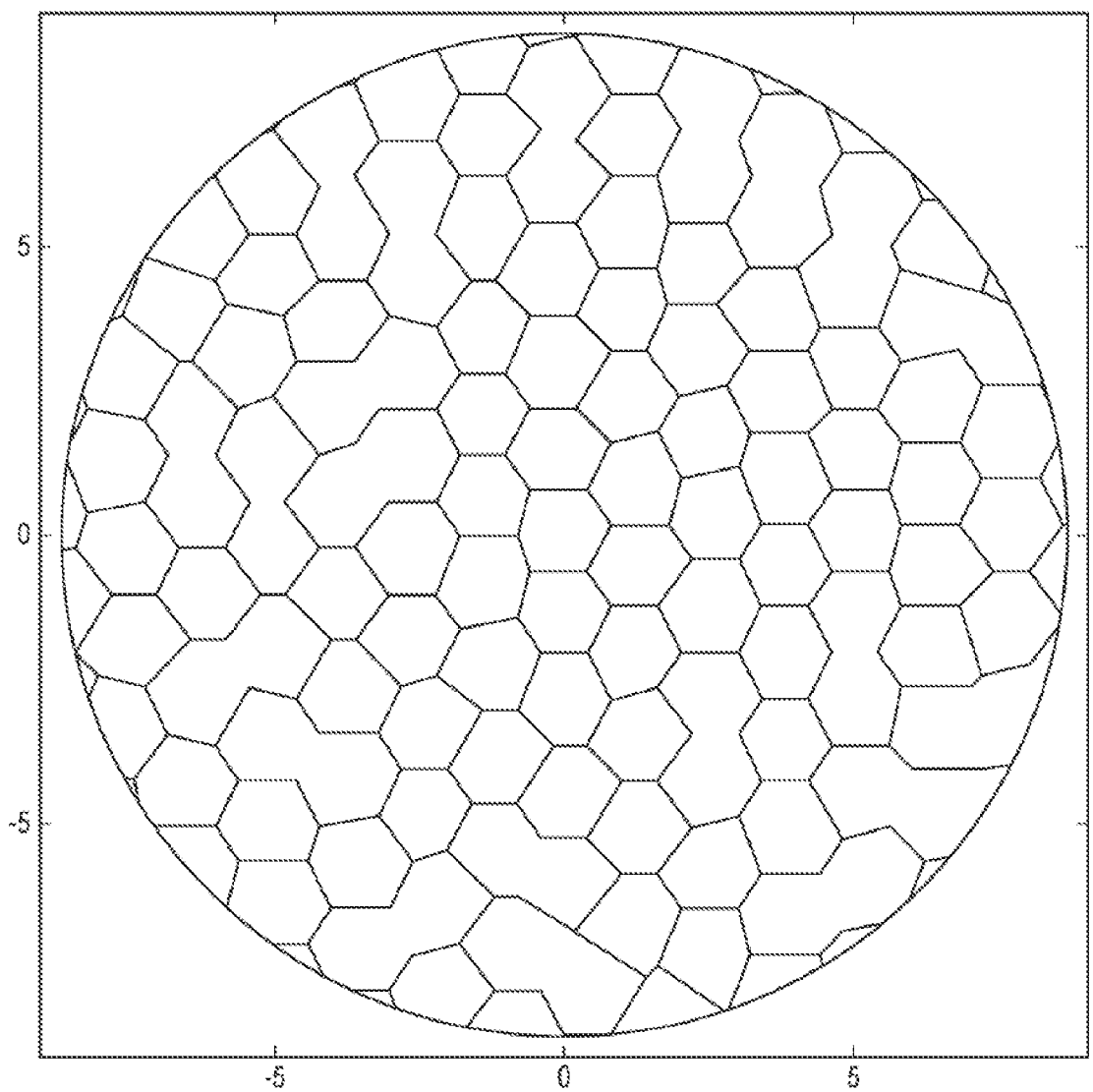
FIG. 6 shows a sample merged beam layout in an embodiment.

FIG. 5 shows an example of first-order beam merging O1 on the hexagonal original beam layout from FIG. 1, followed by an optional geometry simplification O2 to simplify beam weight synthesis. Second or higher-order merging of the previously merged cells may also be implemented, subject to the same or similar set of constraints. FIG. 6 shows the merged results of the optimised beam layout in FIG. 4, with some second-order merges and no geometry simplification.

Whilst the above algorithm may be applied to beams with a single partially used carrier, the same method could be applied to the remaining capacity in multi-carrier beams, particularly if the low-throughput terminals are shifted to the merged beam. Additionally, the layout optimisation and beam merge systems do not intrinsically share any internal state, meaning that they do not necessarily need to be synchronised and may be run as two autonomous stages or independently disabled as necessary.

Quantisation & Hysteresis

Due to the inter-dependency between neighbouring beams, it may be desirable to quantise the beam layout polygon vertices to a suitably spaced grid or use hysteresis from previous layouts to reject insignificant changes in beam shape, as in step S7. This would reduce the numbers of beams patterns requiring recalculation when changes to the layout occur.

Additionally, caching of the generated beam patterns may allow for quick reuse in the event a beam shape reverts to a previously calculated target pattern.

Overlay/Tracking Beams Specific terminals or terminal groups may be allocated one or more carriers to provide a priority or dedicated service. These terminals or groups may be high-throughput, high-priority or otherwise selected from the general terminal population. In such cases, one or more 'overlay' beams may be generated for these carriers, with the beam pattern aligned to give peak performance over the terminal or group location. These overlay beams would operate independently from the beam layout optimisation method and the locations and parameters for the selected terminals or groups should be removed from the optimisation inputs TD.

Beam Synthesis

The final step (S8) in applying a new beam layout is to synthesise the phased-array element beam weights to match or approximate each target beam's shape and RF characteristics, producing a set of beam patterns. This beam synthesis step S8 may be carried out by a separate functional entity, shared between different services on the same system, where interference and isolation can be managed. For example, the beam weights may be synthesized by a beam weight generator and provided to a beam former on a satellite so as to generate the set of beam patterns.

Alternative Embodiments

Alternative embodiments of the invention may be envisaged, which may nevertheless fall within the scope of the accompanying claims.

The invention claimed is:

1. A method of generating an optimized beam layout for a satellite in a satellite communications system, the method comprising:
   a. receiving terminal and/or network data representing a distribution of communications terminals to be served by the satellite in the coverage area;
   b. optimizing the positions of a set of beam centers with respect to the terminal and/or network data, to generate optimized beam center positions;
   c. deriving an optimized beam layout from the optimized beam center positions;
   d. merging one or more adjacent beams in the optimized beam layout to generate merged optimized beam layout data, wherein the merged adjacent beams correspond to areas of low traffic; and
   e. outputting the merged beam layout data,
   wherein the method includes identifying one or more high traffic or high priority terminals from the terminal and/or network data and determining an overlay beam directed to the one or more high traffic terminals, and wherein the traffic from the one or more high traffic or high priority terminals is removed from consideration of the optimized beam layout.

2. The method of claim 1, wherein the terminal and/or network data is represented by a density function.

3. The method of claim 1, wherein the step of optimizing the positions of the beam centers comprises minimizing a function.

4. The method of claim 3, wherein the function represents an attraction of the beam centers to regions of high parameter density.

5. The method of claim 3, wherein the function represents one or more constraints in the spacing between the beam centers.

6. The method of claim 3, wherein the function represents one or more constraints on distance of each beam center from a previous position.

7. The method of claim 3, wherein the function represents containment of the beam centers within a given coverage area.

8. The method of claim 3, wherein minimizing the function includes ensuring a global or near-global minimum.

9. The method of claim 3, wherein the function is a scalar function.

10. The method of claim 1, wherein the optimized beam layout data is derived from the optimized beam center positions so as to minimize the distance of locations within the coverage area from the optimized beam centers.

11. The method of claim 1, wherein merging the one or more adjacent beams includes simplifying the geometry of the optimized beam layout.

12. The method of claim 1, including quantizing the optimized beam layout.

13. The method of claim 1, comprising iteratively performing the method steps of a. through e., wherein the terminal and/or network data varies with time.

14. A method of generating an optimized beam layout for a satellite in a satellite communications system, the method comprising:
   a. receiving terminal and/or network data representing a distribution of communications terminals to be served by the satellite in the coverage area;
   b. optimizing the positions of a set of beam centers with respect to the terminal and/or network data, to generate optimized beam center positions;
   c. deriving an optimized beam layout from the optimized beam center positions;
   d. merging one or more adjacent beams in the optimized beam layout to generate merged optimized bean layout data, wherein the merged adjacent beams correspond to areas of low traffic; and
   e. outputting the merged beam layout data,
   wherein the method includes synthesizing a set of beam weights to match or approximate the optimized beam layout.

15. The method of claim 14, wherein the terminal and/or network data is represented by a density function.

16. The method of claim 14, wherein the step of optimizing the positions of the beam centers comprises minimizing a function.

17. The method of claim 16, wherein the function represents an attraction of the beam centers to regions of high parameter density.

18. The method of claim 16, wherein the function represents one or more constraints in the spacing between the beam centers.

19. The method of claim 16, wherein the function represents one or more constraints on distance of each beam center from a previous positon.

20. The method of claim 16, wherein the function represents containment of the beam centers within a given coverage area.

21. The method of claim 16, wherein minimizing the function includes ensuring a global or near-global minimum.

22. The method of claim 16, wherein the function is a scalar function.

23. The method of claim 14, wherein the optimized beam layout data is derived from the optimized beam center positions so as to minimize the distance of locations within the coverage area from the optimized beam centers.

24. The method of claim 14, wherein merging the one or more adjacent beams includes simplifying the geometry of the optimized beam layout.

25. The method of claim 14, including identifying one or more high traffic or high priority terminals from the terminal and/or network data and determining an overlay beam directed to the one or more high traffic terminals.

26. The method of claim 25, wherein the traffic from the one or more high traffic or high priority terminals is removed from consideration of the optimized beam layout.

27. The method of claim 14, including quantizing the optimized beam layout.

28. The method of claim 14, comprising iteratively performing the method steps of a. through e., wherein the terminal and/or network data varies with time.

* * * * *